United States Patent [19]
Wills et al.

[11] Patent Number: 5,070,341
[45] Date of Patent: Dec. 3, 1991

[54] LIQUID STREAM DEFLECTION PRINTING METHOD AND APPARATUS

[75] Inventors: Leslie J. Wills, Lidcombe; David E. Turvey, Beecroft, both of Australia

[73] Assignee: Commonwealth Scientific and Industrial Research Organisation, Australia

[21] Appl. No.: 343,330

[22] PCT Filed: Aug. 28, 1987

[86] PCT No.: PCT/AU87/00294

§ 371 Date: Mar. 24, 1989

§ 102(e) Date: Mar. 24, 1989

[87] PCT Pub. No.: WO88/01572

PCT Pub. Date: Mar. 10, 1988

[51] Int. Cl.[5] .......... G01D 15/18
[52] U.S. Cl. .......... 346/1.1; 346/75
[58] Field of Search .......... 346/1.1, 75

[56] References Cited

U.S. PATENT DOCUMENTS 3,769,625 10/1973 Gunn .......... 346/1.1
4,621,268 11/1986 Keeling et al. .......... 346/1.1

*Primary Examiner*—Benjamin R. Fuller
*Assistant Examiner*—Gerald E. Preston
*Attorney, Agent, or Firm*—Sughrue, Mion, Zinn, Macpeak & Seas

[57] ABSTRACT

Electrostatic deflection of portions of a liquid stream is used to generate lengths of liquid (called "slugs" of liquid) for use in jet printing apparatus. The liquid stream is projected along a path alongside a linear or arcuate array of electrodes. When a voltage signal is applied sequentially to each electrode of the array at a rate which corresponds to the velocity of liquid of the stream past the electrodes, a portion of the liquid is deflected out of the path of the stream and towards the array. Either the deflected portion or the undeflected stream is intercepted before it reaches a surface which is to be printed. The slugs of liquid may break up naturally into droplets before the interception of the deflected portion or the undeflected stream, or after the interception has occurred. High resolution printing with high volumes of liquid is possible using this invention.

20 Claims, 8 Drawing Sheets

LIQUID STREAM DEFLECTION PRINTING METHOD AND APPARATUS

FIELD OF THE INVENTION

This invention concerns the control of liquid jets. More particularly, it is concerned with the accurate selection of discrete longitudinal portions of a stream of liquid (hereinafter termed "slugs" of liquid) for printing purposes. It is particularly applicable to the selection of slugs of liquid for printing using jet printers.

BACKGROUND

Jet printers (often called "ink jet printers" because they have been used extensively in the printing of alphanumeric characters on paper with a printing ink) are well known. Such printers usually produce a continuous fine stream of droplets when a pressurised supply of a liquid such as ink or a dye is connected to and issues from a small orifice. The individual droplets in the stream are charged as they leave the orifice. They are then deflected with an electrostatic field so that they strike a surface to be printed at a required point or are directed to a collector without reaching that surface.

The droplet production arrangement most widely used in such printers is that described by R. G. Sweet in the specification of his U.S. Pat. No. 3,596,275. In this arrangement, uniform droplets are formed from a liquid jet as it issues from a fine nozzle. Some of these droplets are charged by a charging electrode at the instant the droplet breaks off from the stream from the nozzle, and are subsequently deflected by an electrostatic field to specific recording sites on a surface to be printed. The amplitude of the deflection of a droplet is in proportion to the charge it has acquired from the charging electrode. Droplets which are not charged at the break off time are not deflected by the electrostatic field and are caught, before hitting the surface to be printed, by a collector (usually called a gutter) and are recycled to the liquid supply.

In practice, when operating this type of jet printer, several difficulties are experienced. These difficulties are mainly related to the correct formation of the droplets, the presence of concurrently formed satellite droplets, and the inducing of the charge on the droplets at the instant of formation (failure to correctly charge the droplets results in inaccurate and unreliable printing).

An alternative arrangement for this type of process has been described by R. G. Sweet and R. C. Cumming in the specification of their U.S. Pat. No. 3,373,437. In this arrangement, multiple streams of liquid issue from orifices arranged in a linear array. As these streams break up into droplets, some of the droplets are charged. Those droplets that are charged are electrostatically deflected to a collector or gutter and the uncharged droplets continue to the surface to be printed. When using this type of jet printer, difficulties similar to those outlined above are experienced, and in addition there are difficulties associated with the provision of a large number of jets and the close spacing of their orifices and charging electrodes. Because the single modulating element used to create the droplets does not impart the same stimulation energy to each liquid stream, the streams break up into droplets at different distances from the orifice and precise charging of individual droplets is impossible.

To some extent these difficulties have been obviated in the apparatus disclosed by C. H. Hertz in the specification of his U.S. Pat. No. 3,416,153 and by R. L. Gamblin in his published UK specification No. 2,108,433. Both of these specifications describe arrangements in which an unstimulated liquid jet is used and the natural breakup of the stream into non-uniform, or randomly sized, droplets is allowed to occur.

In the Hertz process, the droplets are dispersed radially from the projected jet axis in the form of a cone by the mutual repulsion of charge induced by a single annular charging electrode placed in close proximity to the stream at the break off point. The dispersed droplets are prevented from reaching the surface to be printed by an annular collector. The absence of a voltage on the charging electrode leaves the droplets uncharged. The uncharged droplets continue undispersed through the central aperture of the collector and strike the printing surface.

A limiting feature of the Hertz process is that single droplet resolution is difficult to achieve and more usually several droplets strike the surface being printed at every point. Furthermore, the process is best suited to very fine jets so that the mutual coulombic repulsion dispersion can take place in a practical distance from the orifice. This feature gives the Hertz process only limited usefulness in printing applications where large volumes of fluid are required (such as the printing of textile fabrics).

In the Gamblin approach, droplets of random size are formed from unstimulated jets. According to Gamblin, the randomly formed droplets from a single jet have a narrower distribution of size and breakoff point variability than had been thought previously, so that jet printers similar in form to that disclosed by Sweet and Cumming in the specification of U.S. Pat. No. 3,373,437 can be made to operate reliably and with acceptable printing accuracy using unstimulated fluid streams. But there is a major difficulty in practising the Gamblin approach, namely the aforementioned problem associated with the large number and close spacing of the jet streams, and the need to closely surround each droplet stream with the required individual charge electrode.

A different approach to droplet production has been described by R. A. Toupin in the specification of his U.S. Pat. No. 3,893,623. Toupin modulates a fine liquid stream to give it an initial varicosity, which grows and results in droplets of different diameter being formed from the stream. The droplets which have a diameter greater than a predetermined value impinge upon a curved surface of a weir and attach themselves to the weir in accordance with the Coanda effect. Smaller droplets clear the weir (and a subsequent baffle) and may be electrostatically deflected before striking a surface to be printed. A closely spaced array of jets can utilise a single weir and baffle.

The Toupin technique avoids the problems associated with the charging of droplets at the instant of their formation, but the selection of printing droplets from the stream is effected near the point of droplet breakoff. Thus the Toupin arrangement, in practice, requires droplets to have a long trajectory before striking the surface to be printed, which is undesirable for accurate printing.

Although jet printers using droplets are the most common form of jet printers, there have been proposals to control a jet of printing liquid by deflecting portions of it. One such proposal is that developed by N. E. Klein and W. H. Stewart and disclosed in the specification of their U.K. patent No. 1,456,458. The technique described in that specification requires that each jet stream in a linear array of liquid streams issuing from an orifice plate may be deflected by a current of air. The currents of air are directed against their respective streams by hollow tubes placed in close proximity to the streams. The deflected streams are caught in a gutter. Each current of air is controlled to be either flowing or absent by an electrically operated pneumatic valve. The jet stream of recording fluid strikes the printing substrate when this valve is in the "off" condition and the current of air does not impinge on and deflect the liquid stream.

This method is inherently reliable in the fluid control domain but has a relatively low frequency response of stream deflection which is limited primarily by the switching speed of the electro-pneumatic valves available and the limitations imposed by the velocity of sound in air. This low frequency response translates to low spatial resolution on the printing surface.

Another stream deflection apparatus—a recorder—is described in the specification of U.S. Pat. No. 1,941,001, granted in 1933 to Clarence W. Hansell. In Hansell's recorder, an unbroken liquid stream is attracted by an electrode to which a high voltage has been applied. The deflected stream of liquid may be intercepted by a baffle placed between the nozzle from which the stream emanates and the printing surface. When this arrangement is used, only that part of the stream which is undeflected reaches the printing surface.

In principle, the Hansell apparatus, should function effectively when a mark/no mark signal recording arrangement is required. It is believed that such apparatus does function well for short periods of time (for example, when recording during a scientific experiment) but problems have been experienced when similar apparatus has been used in a prototype jet printer. The main problem arises because the transition of the stream from one trajectory to another takes a finite time. The leading edge of the baffle intercepts liquid in the transition region between the deflected and undeflected streams. This leads to a build-up of liquid which reduces the selectivity of the baffle (collector), leading to poor resolution and unwanted fouling on the printed surface.

DISCLOSURE OF THE PRESENT INVENTION

It is an object of the present invention to provide a method and apparatus for selecting slugs of liquid from a continuous liquid stream, for use in jet printers, which substantially avoids the disadvantages of the prior art techniques and arrangements that have been outlined above.

This objective is achieved by deflecting a portion of an unbroken stream of liquid from its normal trajectory and using either a baffle or a weir (optionally using the Coanda effect) to separate the deflected portion from the remainder of the liquid stream and thus produce liquid slugs of varying length which can be used for printing purposes. It will be appreciated that slugs having a short length become small droplets of liquid.

To effect the deflection of a portion of the unbroken stream of liquid (which is established without any perturbation being applied to the liquid at or near the generation point of the stream), an array of electrodes, which may be a linear of arcuate array of electrodes, is mounted close to the stream of liquid. An electric signal is applied sequentially to the electrodes in the array as the portion of the liquid stream which is to be deflected flows past them. The voltage signal applied to than electrode induces a charge of the opposite sign in the region of the fluid stream that is adjacent to that electrode and the resultant attraction causes the portion of the liquid stream that is adjacent to that electrode to be deflected towards that electrode as it passes it. If a baffle (preferably a weir of the type described in the specification of U.S. Pat. No. 3,893,623) is placed so that it intercepts either the undeflected liquid stream or the deflected portion of the stream, the charging of the electrodes can be used to produce a required droplet, slug of liquid, or liquid stream.

Thus, according to the present invention, there is provided a method for producing a supply of liquid slugs of predetermined length, said method comprising the steps of a) establishing a continuous stream of liquid from an orifice, said liquid stream having no perturbation applied thereto at or near said orifice, and having a natural break-off point at which the continuous stream breaks up into droplets;

b) causing the continuous stream of liquid to pass over an array of electrodes positioned between said orifice and said break-off point, said array of electrodes extending in the same direction as said stream of liquid;

c) applying a voltage signal sequentially to the electrodes of the array, at a rate which is substantially equal to the velocity of the liquid of the stream past the electrodes, to deflect a portion of the liquid stream away from the undeflected path of the stream; and d) interrupting and collecting either the deflected portion or the undeflected portion of the liquid stream.

Also according to the present invention, there is provided apparatus for producing a supply of liquid slugs of a predetermined length, the apparatus comprising a) an orifice for establishing a continuous stream of liquid;

b) an array of electrodes mounted adjacent to the path of the continuous stream of liquid;

c) means for applying a voltage signal sequentially to the electrodes of the array at a rate which is substantially equal to the velocity of the stream of liquid past the electrodes, to thereby cause a charge of opposite polarity to the voltage signal to be induced on that portion of the liquid stream which is moving past the electrodes and thus cause that portion to be deflected towards the array of electrodes; and d) interruption means positioned to intercept either the undeflected stream of liquid or the portion thereof deflected by the charged electrodes;

whereby the liquid which is not intercepted by the baffle or the weir forms a liquid slug.

As already noted, it is preferred that the interruption means is a convexly curved weir, so that the intercepted liquid attaches itself to the weir by the operation of the Coanda effect.

When a linear array of electrodes is used, a second linear array of electrodes may be positioned on the opposite side of the liquid stream to the first-mentioned array of electrodes, in which case the second array of electrodes will be charged in a manner (described below) that enhances the deflection of the portion of the liquid stream by the electrodes of the first-mentioned array of electrodes.

Curved electrodes, partially encircling the continuous liquid stream, or arcuate and segmented elongate electrodes may be used to steer the liquid stream in a required manner.

Embodiments of the invention, which are provided by way of example only, will now be described, with reference to the accompanying drawings.

DETAILED DESCRIPTION OF THE ILLUSTRATED EMBODIMENTS

The present invention uses the application of an electrostatic force on a coherent unbroken liquid stream, prior to its natural breakup into droplets, to deflect a portion of the stream from its normal path. In practice this effect is achieved by placing a linear or arcuate array of electrodes in close proximity to the unbroken stream and applying a voltage signal sequentially to each electrode of the array. When a voltage is applied to an electrode, a charge is induced on a portion of the stream, which is then attracted by the surface charge on the electrode. The electrostatic forces acting on the portion of the liquid stream thus produce a resultant deflection of that portion of the stream. To maintain the application of the attraction force to the required portion of the liquid stream as it flows past the electrodes in the array, the voltage signal has to be applied to each electrode in turn at time intervals which are such that the velocity of propagation of the voltage signal along the array of electrodes is substantially the same as the jet stream velocity.

Since each electrode in the series can only attract the stream immediately adjacent to it, the resolution achievable theoretically is a single slug of the liquid stream, approximately equal in length to the dimension in the direction parallel to the stream flow of a single electrode segment. The deflection amplitude achieved is the same as would be achieved if a single electrode, equal in length to the sum of the individual electrode segments, were used. Thus to increase the resolution of a jet printer, a larger number of smaller electrodes should be used in the array.

Figure 1:
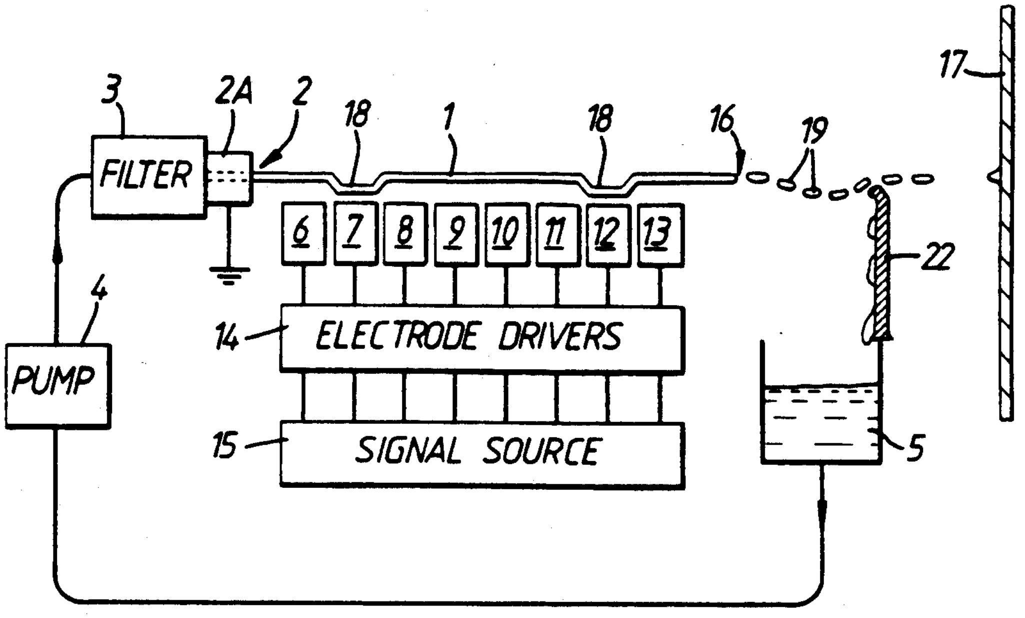
FIG. 1 is a schematic diagram of one form of liquid slug producing apparatus constructed in accordance with the present invention.

In the embodiment of the present invention that is illustrated in FIG. 1, a liquid stream 1 (for example, an ink stream or a stream of a liquid dye) issues under pressure from an orifice 2 of a nozzle 2A which is supplied with liquid through a filter 3. The liquid supply is maintained by a pressure pump 4 communicating with a fluid reservoir 5. A linear array of deflection electrodes 6, 7, 8, 9, 10, 11, 12 and 13 are positioned adjacent to the liquid stream 1. These electrodes are connected to respective high voltage electrode drivers 14 which are controlled by a digital data source 15. If a voltage is applied to one or more of the electrodes in the array, at least one portion 18 of the liquid stream is deflected from the normal path of the stream. The unbroken liquid stream breaks into droplets 19 of random size at point 16. The droplets project towards a surface 17 that is to be printed. (As indicated earlier, if the projected slugs are very short, they become single droplets of liquid.) Undeflected liquid passes the extremity of a stream catcher formed by a baffle 22. The droplets formed from slugs of liquid which has been attracted towards the deflection electrodes are caught by the leading edge of the baffle or collector 22 and do not impact upon the printing surface 17. Although in FIG. 1 the stream 1 is shown to break into droplets 19 at the breakoff point 16, it will be at once apparent to those skilled in this art that it is not necessary for the liquid stream to break into droplets in order for the liquid to be collected at the baffle 22. In fact, alternative stream collection arrangements to the one shown in FIG. 1, operating on the unbroken stream of liquid with its displaced portions, function more efficiently, in the sense that less stream deflection is required for collection. Such alternative arrangements are illustrated in the subsequent figures.

Figure 2:
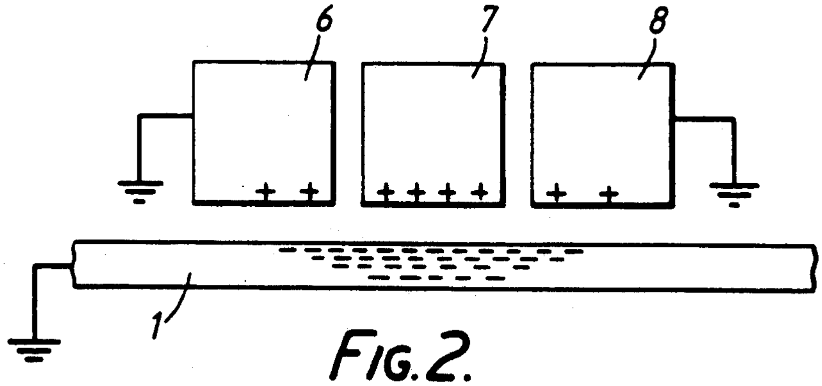
FIG. 2 shows the charge distribution that is established when a single electrode is charged.

FIG. 2 has been included to show how charge is induced in a liquid stream when a voltage signal is applied to an electrode. FIG. 2 shows three electrode segments 6, 7, 8 of a linear array of electrodes, adjacent to the fluid stream 1. The stream 1 is earthed relative to the electrode. A positive voltage has been applied to electrode 7. This positive voltage causes a redistribution of negative charge in the stream and particularly on the stream surface in the region of the electrode 7. FIG. 2 shows electrodes 6 and 8 as grounded and that the region of field influence from the voltage on electrode 7 extends beyond the physical limits of that electrode. The present inventors have found that with an electrode length of 1 mm, the total length of the stream to be affected is as much as 3 mm when using this arrangement.

Figure 3:
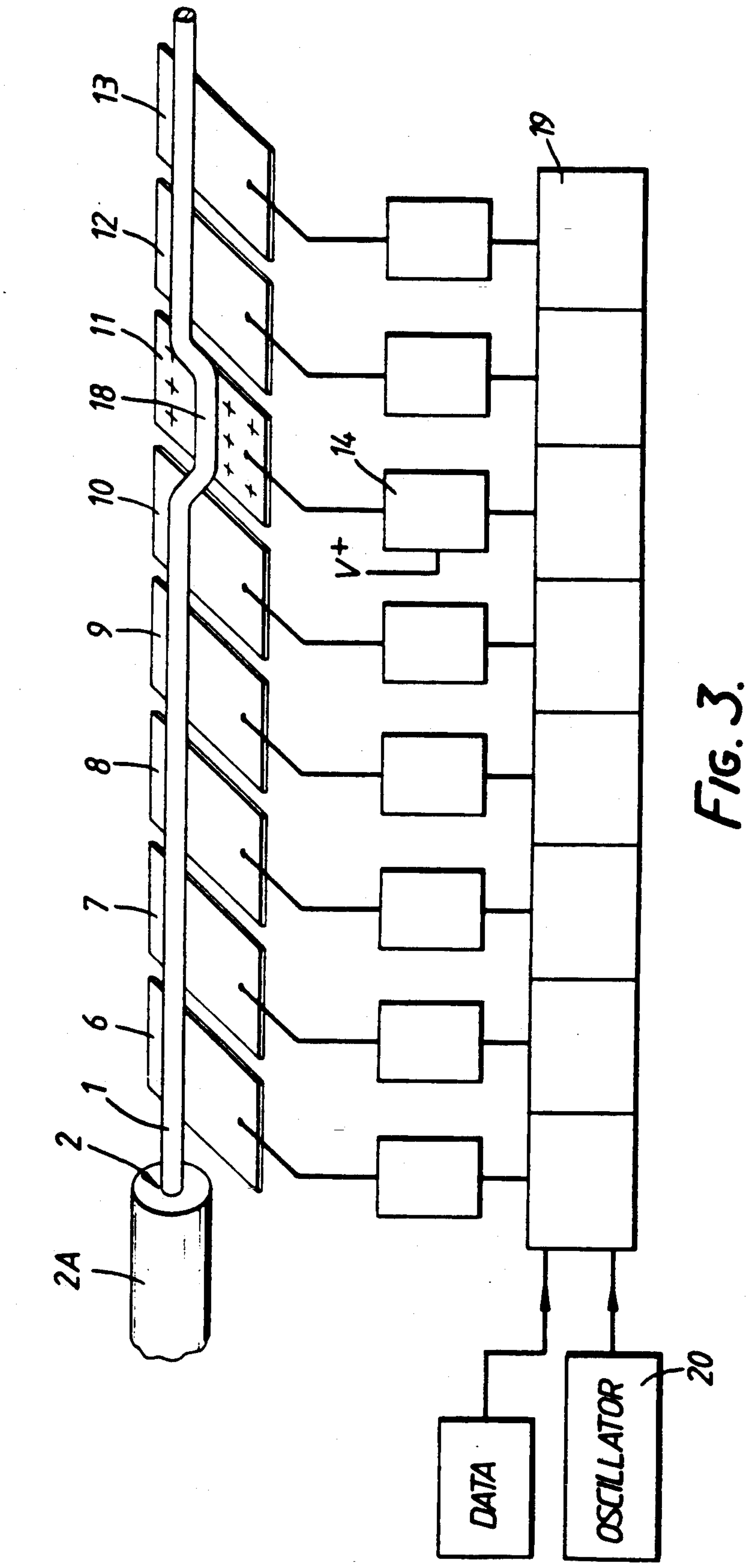
FIG. 3 illustrates the displacement of a portion of the liquid stream when a voltage pulse is applied to an electrode placed in close proximity to the liquid stream.

In FIG. 3, the electrodes 6, 7, 8, 9, 10, 11, 12 and 13 are shown as planar conducting plates closely positioned to the unbroken stream 1. The deflected section or portion 18 of the stream is adjacent to the electrode element 11, shown here as having a positive surface charge as a result of being connected by the switch unit of its associated driver 14 to a high voltage supply V+. The positive surface charge on the electrode 11 induces a corresponding negative surface charge on the stream 1 in the region 18 so that the stream element 18 is attracted to the electrode 11. Thus, with this arrangement, if the voltage signal is applied to each of the electrodes 6 to 13 in turn, at a rate which matches the velocity of the stream, the stream 1 can be regarded as a moving electrode attracted in turn to each of the stationary electrode elements 6, 7, 8, 9, 10, 11, 12 and 13. Hence the deflected portion 18 of the stream shown adjacent the electrode element 11 has an amplitude of displacement equal to that which would occur if the electrostatic force had acted for the total time that the stream takes to travel from the orifice 2 to the electrode 11.

If, however, all of the electrodes 6, 7, 8, 9, 10, 11, 12 and 13 had a positive attractive charge switched to them and acted on the stream during the interval that displaced section 18 has taken to transit from the orifice 2 to the region adjacent to the electrode 13, then a long section of the stream, which extends from the region of electrode 6 to a point one array spacing downstream from the electrode 13, would be displaced by varying amounts according to the time of action of the electrostatic force of attraction.

The method by which the only displaced position or section 18 of the fluid stream 1 is given a displacement equal to that which would occur if the electrostatic force induced by electrode elements 6, 7, 8, 9, 10, 11, 12 and 13 had acted for the total time that the indicated section 18 of stream 1 takes to transit from the orifice 2 to the region in proximity to the electrode element 13 will be explained in more detail with reference to the timing diagram shown in FIG. 4.

Figure 4:
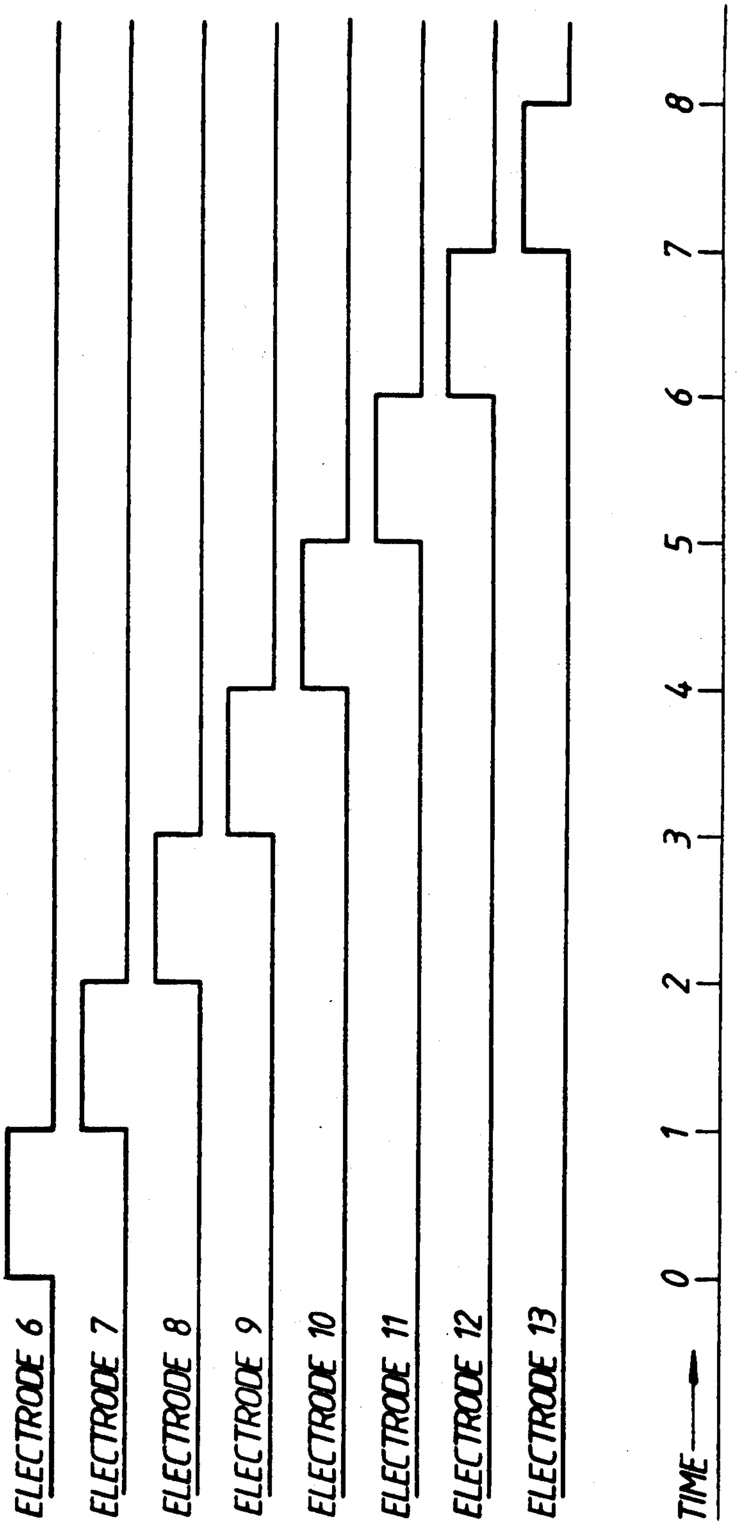
FIG. 4 is a timing diagram showing typical signal waveforms which may be applied to the electrodes of the array of electrodes of the embodiment illustrated in FIGS. 1 and 3 to provide a travelling deflection force for a portion of liquid in the stream.

The wave forms shown in FIG. 4 represent the voltage signals applied to the designated electrodes as a function of time. To those skilled in this art, it can readily be seen that the timing relationship shown in FIG. 4 can be obtained by clocking a single data bit through a shift register 19 using a clock oscillator 20 (see FIG. 3). The clocking frequency of the oscillator is adjusted so that the velocity of propagation of the travelling wave pulse along the segmented electrode comprising elements 6, 7, 8, 9, 10, 11, 12 and 13 matches the velocity of projection of the stream. That is, whenever the displaced portion 18 of the stream is in the vicinity of an electrode segment, a voltage is applied to that segment according to the timing shown in FIG. 4.

The optimal spatial resolution and the maximum displacement of portions of the fluid stream are simultaneously achieved when signals represented by the timing diagram of FIG. 4 are applied to the designated electrodes of FIGS. 1 and 3 in the following manner. To displace a portion of the fluid stream having a length approximately equal to the traversed dimension of a single electrode segment, and emerging from the orifice 2 at time $t=0$, the voltage V+ is switched on to electrode element 6 until $t=1$, when the stream portion will have reached the end of electrode 6. At this time, in accordance with the timing shown in FIG. 4, the voltage signal to the electrode 7 is switched on and the voltage signal applied to the electrode 6 is switched off. This process is accomplished with the apparatus of FIG. 3 by arranging that the propagation rate of the single data bit through the shift register is timed in accordance with the foregoing description and continues until each of the electrodes has been activated in turn by the propagating signal. The process is concluded for a single element of stream deflection when electrode element 13 switches to the inactive state at $t=8$.

The type of shift register which may be used for this purpose is unimportant, and any serial in parallel out type may be used. The 74164 register, marketed by the Signetics Corporation, has been found to work very satisfactorily. The high voltage switching may be accomplished by any one of a variety of switches of equal efficacy for this process. One such switch is a single transistor with passive pull up resistor. A switch that has been used by the present inventors when the electrode supply voltage supply was 350 volts comprised an NPN transistor type 40887 (available from RCA) and a 500 Kohm pull up resistor.

Electronics engineers will appreciate that the shift register arrangement shown in FIG. 3 is just one way of achieving the travelling waveforms required and that other digital methods, such as using a counter and decoder, or a programmed digital computer interface port, or an analog delay line, may also be used for the realisation of this invention.

The physical design of a printhead operating using the travelling wave approach of the present invention is dependent on a number of factors. These include the fluid mass transfer rate, the orifice diameter, the required resolution of the print, the distance to breakup of the fluid stream from the orifice, and the spacing between the electrodes and the stream.

The present invention has been successfully applied to the printing of carpets. In addition to printing applications, however, the present invention may be adapted for other uses. Such other uses include a fuel injection system, in which fuel is supplied to an internal combustion engine, and the distribution of chemicals for crop spraying. In these applications (including carpet printing) high mass transfer rates of liquid are required. In other applications, such as computer line printers and high quality reprographic devices, much lower quantities of liquid mass transfer, combined with a higher spatial resolution of the print, are generally required.

The volume resolution achievable with a printhead which uses the present invention is defined by the length of the portion or slug of liquid which may be displaced from a stream. This is determined principally by the orifice diameter, the length of the individual electrode segments, the stream to electrode spacing, the collector efficiency, the displacement of the stream and the properties of the liquid.

In general, to cover a broad range of applications, the orifice size will be in the range of from 5 micrometers to 1000 micrometers and the range of fluid pressure will be from 10 kilopascals to 1 megapascal. However, the preferred pressure is about 100 kilopascals and the preferred orifice size is about 25 microns when printing paper, about 75 microns when printing textile fabric and about 200 microns when printing carpet and the like.

Although these factors do not operate independently, near optimal operating conditions can be achieved using some prior art ink jet printing knowledge. In synchronous drop ink jet printers of the type described by Sweet in the specification of U.S. Pat. No. 3,596,275, the optimal droplet formation is achieved when the droplet is formed from a length of fluid filament which has a wavelength in the range of from four to ten times the fluid filament diameter. In prototypes of the travelling wave jet printer of the present invention which have been constructed by the present inventors, the electrode dimension in the direction of the stream axis has been selected to be in the range of from five to twenty times the fluid stream diameter with good results.

The number of electrodes in an array (or electrode segments if the array is created as a segmented elongate electrode) that are required to perform the present invention is determined by the deflection required and the stream velocity. In one version of the apparatus that the present inventors have constructed, the stream diameter is 0.4 millimeters and an array consisting of eight electrode segments, each of length 4 millimeters, has been used. With the liquid pressure set to 150 kilopascals, adequate stream deflection for efficient collection was achieved and the length of the printing slug of the fluid stream was approximately equal to the electrode length. At lower liquid pressure, fewer electrodes would be required to achieve the same deflection of the fluid stream. For example, if the apparatus were to be operated at a pressure which halved the projected stream velocity, then only four electrodes would be required to obtain the same deflection. Similarly, more electrodes would be required if the stream velocity should be higher. In general, the number of electrodes required is in proportion to the fluid velocity.

It has also been found that the electrode to stream spacing should be maintained at the minimum practical distance to control fringing fields and the region of influence of individual electrode elements on the fluid filament. The electrode to stream spacings which have been used in the practice of this invention range from 10 to 250 micrometers at the orifice and from 10 to 650 micrometers at the exit end. These spacings give very high electrical field strengths and consequently impart high accelerations to the portion of the stream to be displaced. Calculations indicate that a transverse stream acceleration up to several thousand times the force of gravity is possible with this apparatus when using very fine streams.

Figure 5:
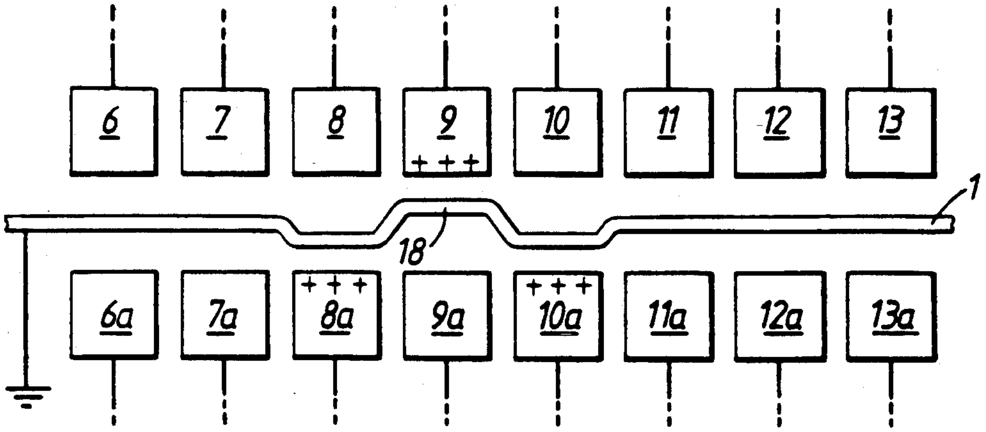
FIG. 5 is a schematic representation of a liquid stream which passes between two opposed arrays of electrodes, the electrodes in each array being charged to enhance the deflection from the liquid stream of a portion thereof.

To achieve a higher spatial resolution of the deflection system, it is necessary to compensate for the effects of fringing fields shown in FIG. 2. It is also advisable to compensate, to a certain extent, for the effect on resolution of internal fluid cohesion. One mechanism for providing such compensation involves the provision of a complementary set of electrodes *6a*, *7a*, *8a*, etc, as shown in FIG. 5. A compensating voltage can then be applied to these complementary electrodes. This compensatory voltage is displaced by one electrode from the active electrode in the first array. Thus, as shown in FIG. 5, whenever a portion of the stream is being deflected in the region of electrode 9, compensating voltages are applied to the electrode segments *8a* and *10a* to prevent the displacement of that filament of the stream which is in the region of these two electrodes and hence to effectively increase the sharpness of the transition on the fluid stream.

Figure 6:
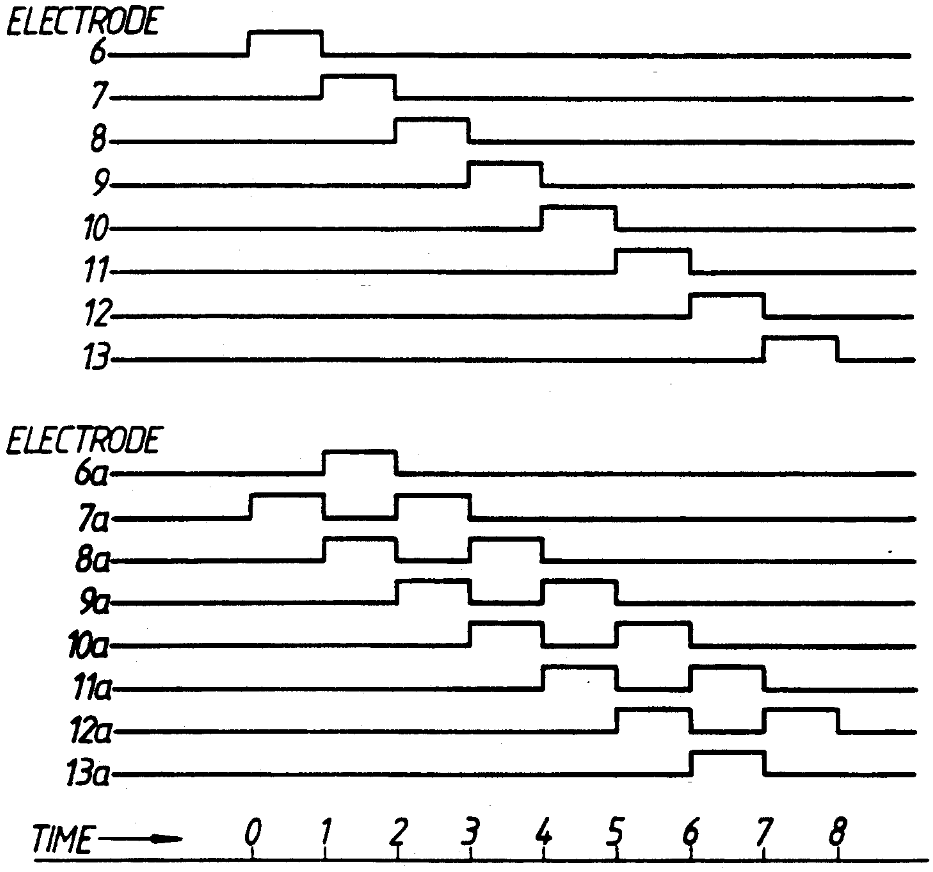
FIG. 6 is a timing diagram illustrating a set of signal waveforms which may be applied to the electrodes of the arrays illustrated in FIG. 5.

The dynamic operation of the compensating electrodes will be more fully understood from reference to the timing diagram of FIG. 6, which shows the timing relationships of the voltages applied to the upper deflection electrodes and to the lower compensation electrodes. It will be seen that whenever a deflection electrode is activated, then compensation is achieved if the compensation electrodes opposite its neighbours are activated. Since the compensation electrodes serve only to prevent displacement of a stream filament outside the active deflection electrode portion, the voltage supply to the compensation electrodes may be considerably less than the deflection voltage or, alternatively, the compensation voltage may act for a shorter time.

Whenever the demands of the data to be printed require more than a single element length to be printed at a point, then the pulse width which propagates along the segmented electrodes will activate the appropriate integral number of adjacent segments simultaneously. In such a case, the compensation voltage will be applied only to the compensation electrodes immediately preceding and trailing the propagating deflection signal.

Figure 7:
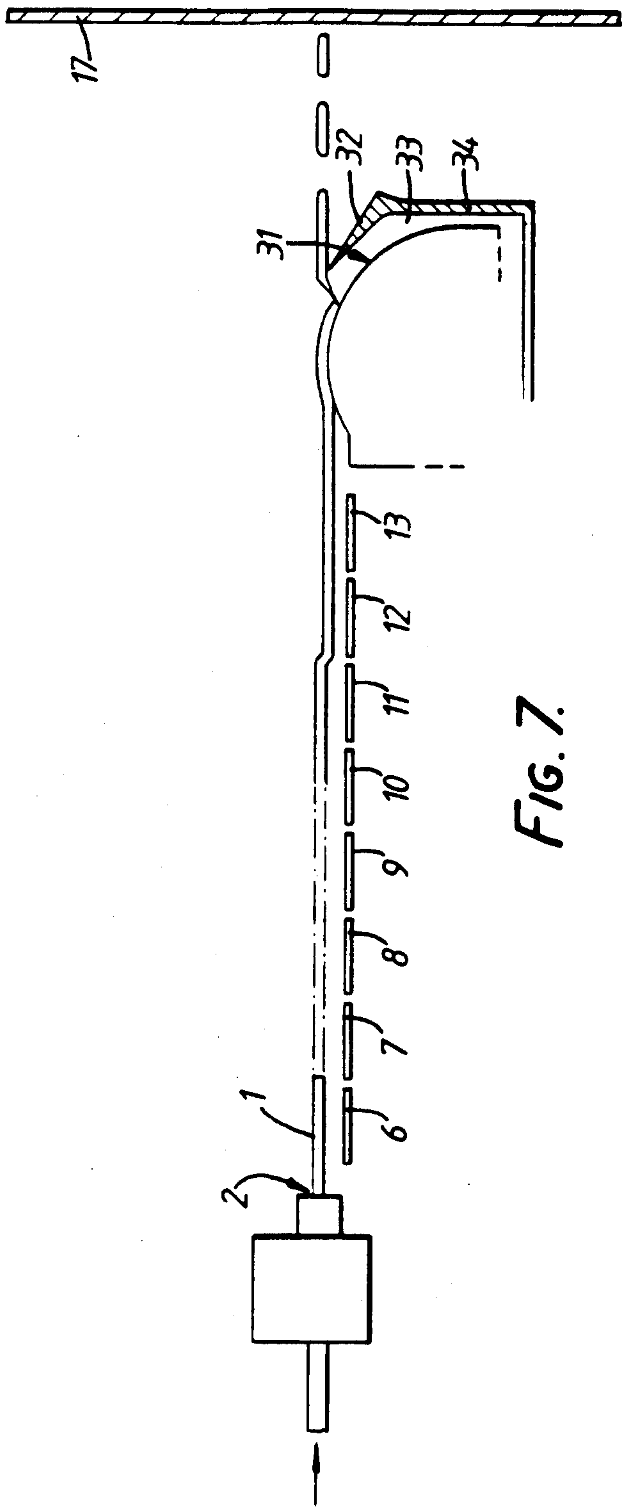
FIG. 7 shows, schematically, the configuration of a liquid slug generator with Coanda effect stream collection of the deflected portion of the liquid stream.
Figure 8:
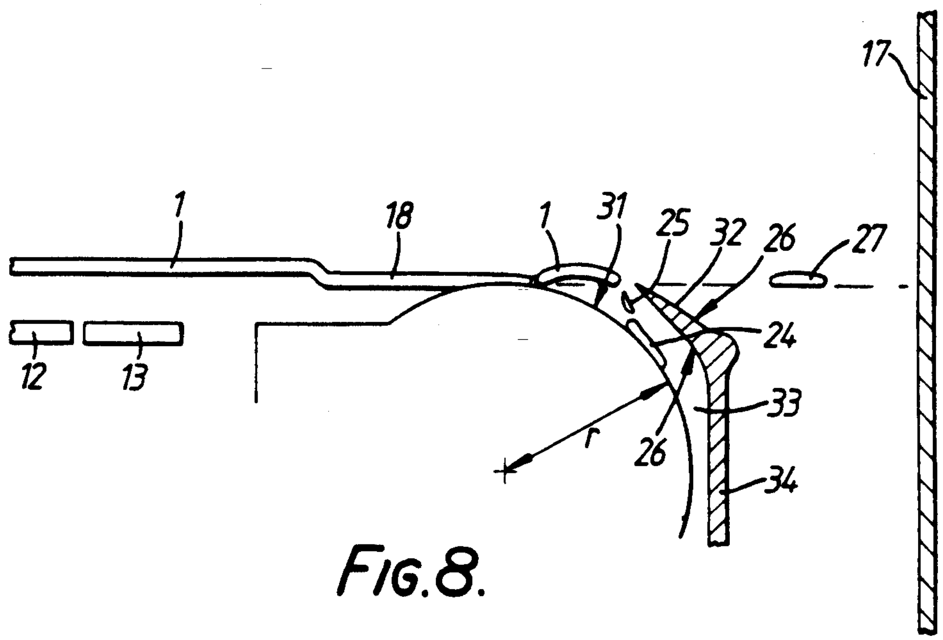
FIG. 8 is an enlarged representation of the stream collection arrangement of the liquid slug generator of FIG. 7.

A schematic diagram of an alternative form of liquid collector to that shown in FIG. 1 is shown in FIGS. 7 and 8. In the apparatus illustrated in these Figures, the portions of the stream 1 that are deflected by the segmented electrode elements 6, 7, 8, 9, 10, 11, 12 and 13 impact upon the convex collector surface 31 and are captured by Coanda adherence to the surface. They may thereafter be easily separated from the undeflected stream which does not touch the surface. The deflection required to capture the stream using the phenomenon of Coanda adherence to a curved surface is about one-fifth the amount required for the baffle collector system shown in FIG. 1.

The arrangement shown in FIG. 7 is most suitable for a binary printer in which the stream projection may be either "on" or "off" beyond the collector surface 31 and the subsequent baffle 34 with its blade-like top 32.

Coanda effect collector systems have been proposed previously for use in the collection of individual droplets in ink jet printers (see the specification of U.S. Pat. No. 3,895,623 to R. A. Toupin referred to earlier in this specification). However, when used in conjunction with the travelling wave stream deflection scheme of the present invention, a substantial improvement in printer resolution is achieved by taking advantage of the improved rise time of the signal pulse as it is seen on the fluid filament. The unbroken coherent liquid stream 1 is projected from the orifice 2 so that when it is undeflected it is not intercepted by the convex surface 31 or the subsequent baffle 34. However, whenever an electrostatic force is applied to the stream, the deflected portion contacts the convex surface 31 at an impact parameter which is about one-fifth of the stream diameter, then the deflected portion of the stream flattens and adheres to the surface 31 and passes down the collector shute 33 formed by the surfaces of collector 31 and the baffle 34. The convex surface 31 has a radius r determined in each application by the stream velocity, the stream diameter, and fluid properties such as surface tension and viscosity, and the presence of additives such as surfactants, long chain molecules or organic compounds which preserve stream integrity and prevent or retard natural stream breakup and droplet formation.

In the arrangement shown more clearly in FIG. 8, the undeflected portion 27 of stream 1 is projected clear of the collector surface 31 and the baffle 32 to strike the printing surface 17 which usually moves in a direction generally orthogonal to the projected stream.

The displacement transition in the fluid stream between the deflected portion 18 and the undeflected stream 1 is rapidly increased as the deflected stream is captured by the convex surface 31 and moves further away from the undeflected stream. As the transition region thins, it often forms a filament of liquid that is independent of the two stream portions. This is shown in FIG. 8, where the stream portion 24 adheres to the convex collecting surface 31 whilst the filament 25, derived from the very sharp rising edge given to the fluid as the deflected stream separates rapidly from undeflected stream sections, is positioned between the deflected slug 24 and the undeflected portion of the liquid stream. The collection efficiency of the apparatus is also enhanced due to the filament portion 25 elongating and becoming thinner than the normal stream cross-section and provision is made for this filament portion to be scoop collected by the blade construction 32 at the top of the baffle 34. This blade region is preferably inclined at a steep angle to the stream to prevent liquid and droplet accumulation on its surfaces 26. Preferably the surface 26 also has a phobic surface reaction relative to the solvent liquid used in the liquid stream (for example, surface 26 will be hydrophobic when water is the liquid base of the solution of stream 1). Slugs 27 of the liquid stream which are not deflected and collected pass beyond the collector to impact upon the recording surface 17.

An alternative arrangement to that shown in FIGS. 7 and 8 is to have the deflection and collection components arranged on opposite sides of the stream so that the electronic signals required are in the relationship "deflect to print" and the undeflected part of the stream 1 impacts upon the convex surface 31 of the collector.

Figure 9:
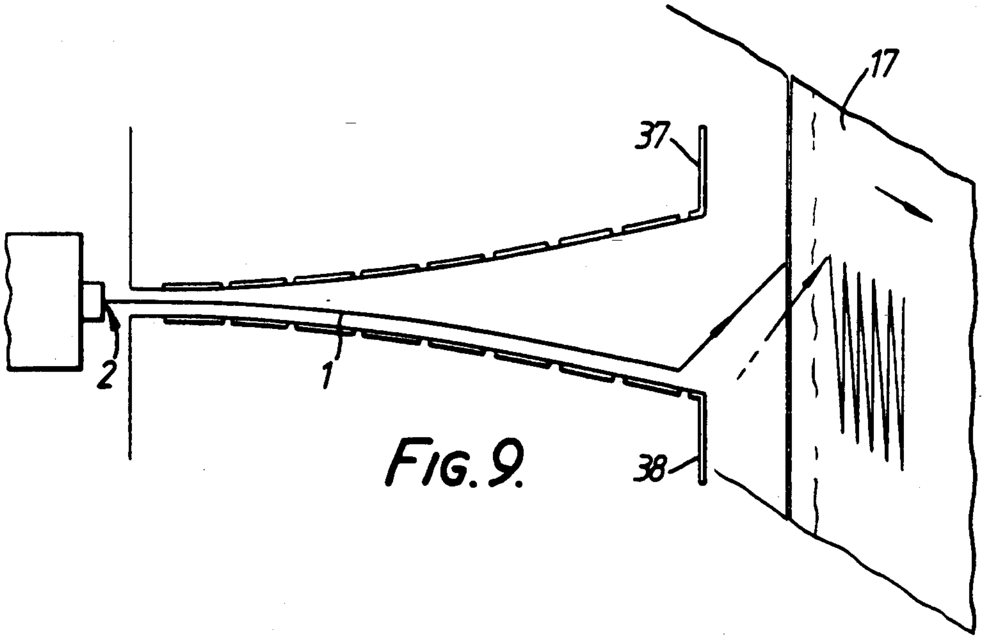
FIG. 9 shows how two arcuate arrays of electrodes may be used to achieve accurate analog deflection of a liquid stream.

The foregoing description mentions the use of a travelling wave stream deflection printer as a binary printer (that is, the stream is controlled to be in either the "on" or the "off" condition . An alternative mode of operation using analog levels of deflection is especially suitable for application to printers having electrostatic raster scanning of the printing stream. An apparatus for achieving this mode of operation is shown in FIG. 9.

Two arrays of electrodes 37, 38 are mounted either side of the path of the liquid stream 1, so that the arrays diverge in the direction of flow of the stream. To provide a to-and-fro scan of the liquid stream, a voltage signal is applied progressively to the electrodes of the array 37 from the first electrode to the last electrode of the array. The voltage signal is then removed from the electrodes of the array 37, progressively, beginning with the last electrode. When the voltage signal has been removed from the last electrode of the array 37, it is applied to the first electrode of the array 38, then progressively to the other electrodes of the array 38. When the voltage signal has been applied to all the electrodes of the array 38, it is progressively removed from those electrodes, the voltage signal being disconnected from the last electrode of the array 38 first. The whole sequence of applying a voltage signal progressively to the electrodes of one array, removing the signal and performing the same action with the other array is then repeated continuously for as long as a to-and-fro scan of the liquid stream is required. Usually the recording medium will be moved relative to the liquid stream during the raster scan (as shown in FIG. 9).

By using a pair of arcuate segmented electrodes 37 and 38 of sufficient length, a large deflection can be given to the liquid stream. In one arrangement as shown in FIG. 9 which was used by the present inventors, a liquid stream of 100 microns diameter with projected velocity of 15 meters per second was given a peak to peak displacement of 5 mm at the recording surface 17. In the particular embodiment, eight electrodes of total length 12 mm were acting on the stream. The stream to electrode spacing was 100 microns at the orifice end of the stream and the same spacing at the final electrode of the arcuate array, when the stream was fully deflected.

Movement of the print head relative to the recording medium 17 can be achieved by mounting the print head on a moving carriage, which is a common practice in the computer industry. Alternatively, the receiving medium may be moved relative to the print head in a direction substantially normal to the plane of the raster scan of the liquid stream.

Figure 10:
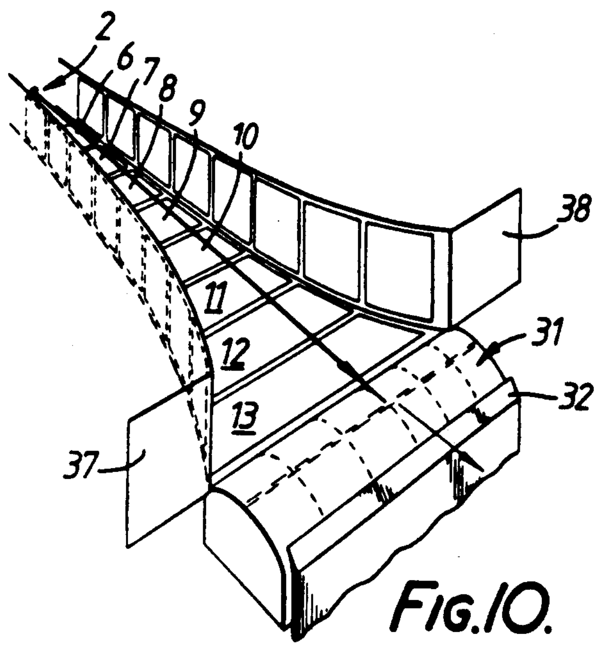
FIG. 10 is a perspective sketch showing how analog deflection and binary stream collection may be combined.

FIG. 10 illustrates an embodiment which combines the features of FIGS. 7 and 9 by providing the "on", "off" binary printing capability of the FIG. 7 embodiment with the electrostatic scanning feature of the apparatus shown in FIG. 9.

In the arrangement shown in FIG. 10, the electrodes 6, 7, 8, 9, 10, 11, 12 and 13, the collector surface 31 and the knife blade 32 of the baffle 34 are the "on", "off" control means for the fluid stream 1.

The opposing segmented electrodes 37 and 38 are provided to produce a raster scan of the fluid stream projection. Such a raster scan is preferably produced by applying a travelling wave signal alternately to the electrode systems 37 and 38. A suitable waveform for driving the deflection electrodes 37 and 38 is a periodic wave which has the signal applied to the segmented electrodes 37 out of phase with the signal applied to the other segmented electrodes, 38, by 180°. It is also preferable to provide means for synchronising a video signal source having the data information to the scanning electronics driving the electrodes 37 and 38, with data from the video signal source being used to control the 'on', 'off' condition of the fluid stream via electrodes 6, 7, 8, 9, 10, 11, 12 and 13 and collector elements 31 and 32.

Figure 11:
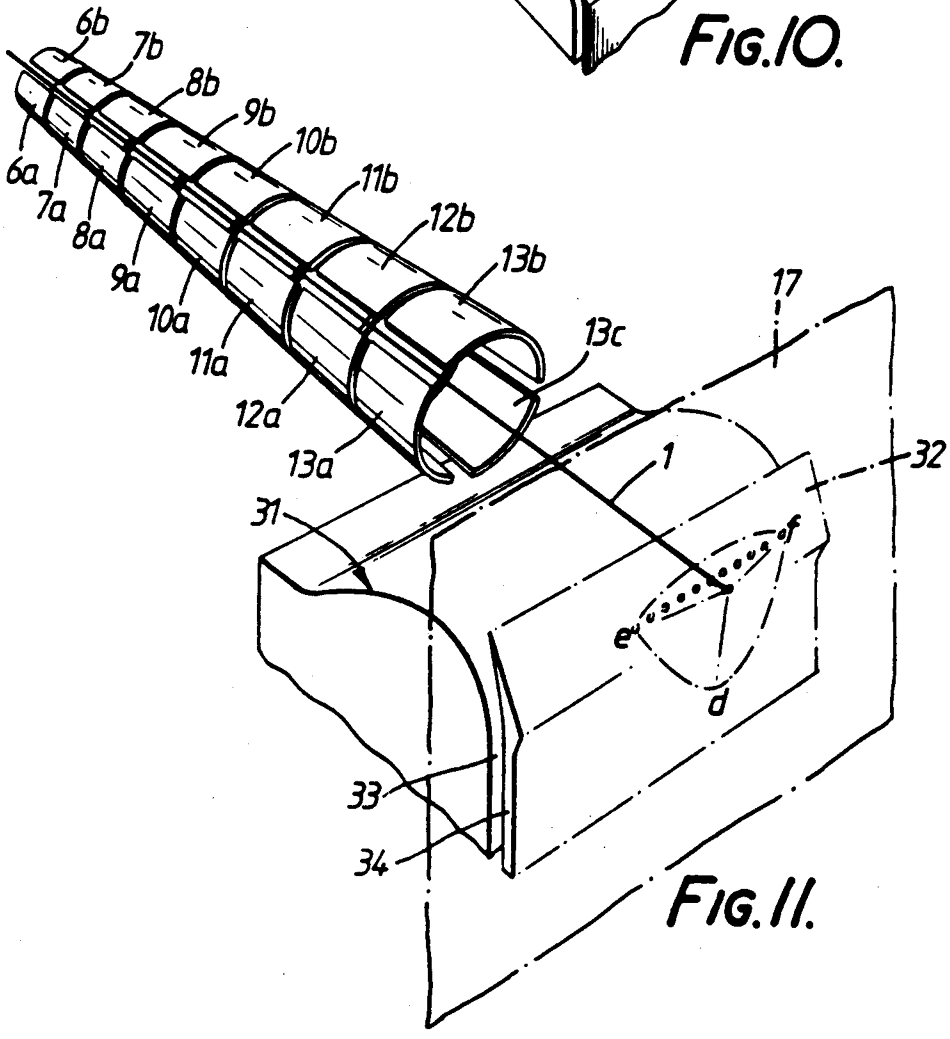
FIG. 11 illustrates a liquid slug generator using an elongate radial array of travelling wave electrodes which may be used to achieve precise analog deflection of a liquid stream.

FIG. 11 shows yet another embodiment of apparatus which includes the present invention. In this embodiment, the liquid stream 1 is surrounded by an elongate radial array of electrodes 6*a*, 7*a*, 8*a*, . . . 13*a*, 6*b*, 7*b*, 8*b*, . . . 13*b*, and 6*c*, 7*c*, 8*c*, . . . 13*c*. When a travelling signal wave is caused to propagate along the 'a' series of electrode segments 6*a*, 7*a*, 8*a*, . . . then a high resolution elemental slug of liquid can be displaced from the undeflected liquid axis towards the active electrodes. When both the 'a' and 'b' series of electrodes are simultaneously activated by travelling wave pulses, then the liquid stream 1 will be deflected in a plane determined by the resultant of the vector components of force acting on the stream When the two forces are equal, this displacement plane will include the undeflected axis of the stream and the line between the 'a' and 'b' electrodes. It can now be seen that by using appropriate circuitry, such as the programmable digital output port of a computer and high voltage switches activated according to the teachings of this invention to produce a propagating waveform, it is possible to deflect the fluid stream 1 to any position within the region defined by the points 'd, e, f' on the printing surface 17. In the arrangement shown in FIG. 11, the convex collector surface 31 is provided to intercept those liquid slugs which would cause printing below the line ef.

Figure 12:
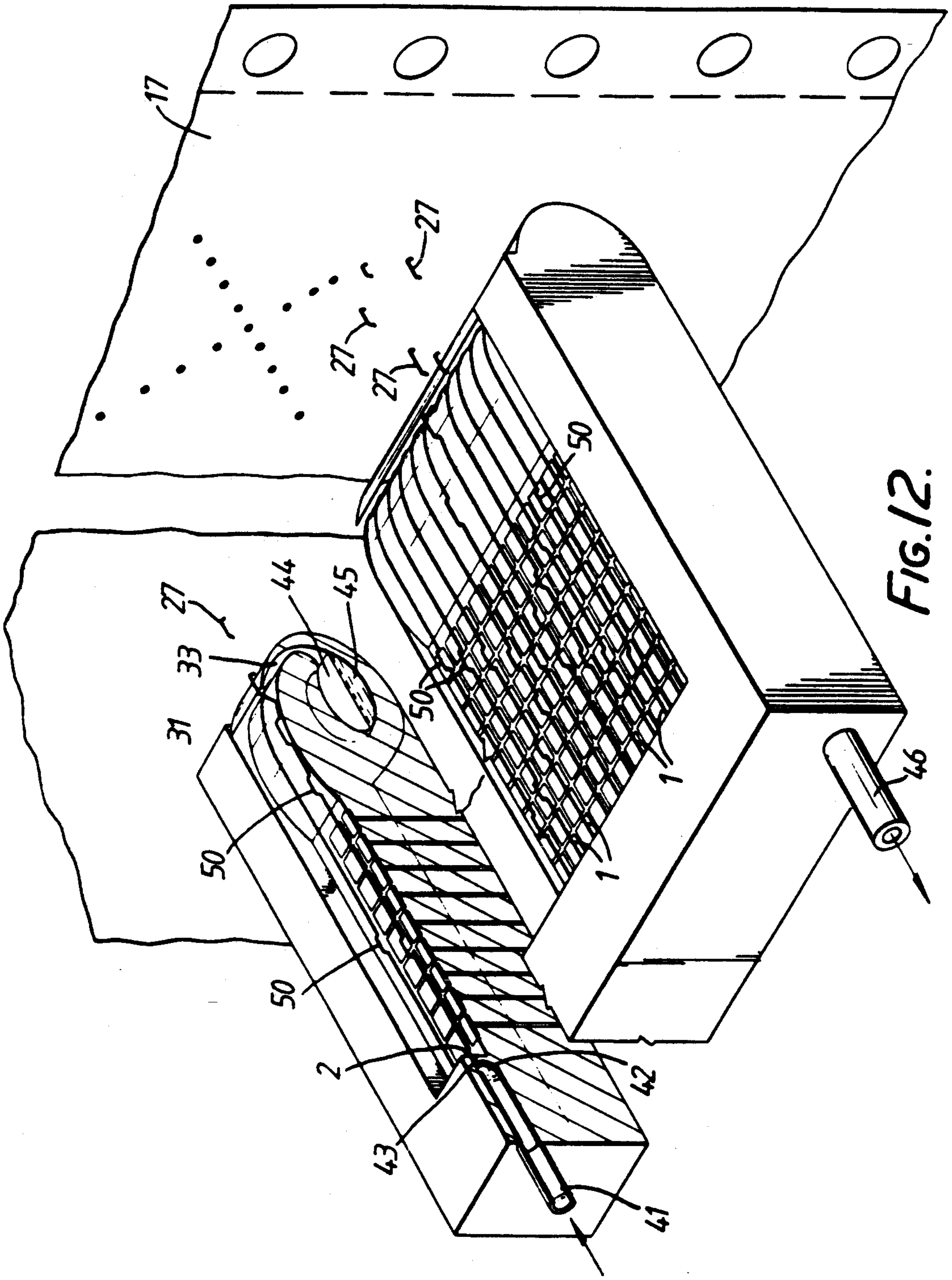
FIG. 12 shows, partly in section, an apparatus using a linear array of orifices and associated orthogonal arrays of travelling wave electrodes, with a Coanda effect collector surface, which may be used as a high speed array printer.

The equipment illustrated in FIG. 12 is a printhead which utilises a number of liquid streams 1, in parallel alignment These streams emerge from a linear array of orifices 2. Recording fluid is supplied to the array of orifices from a pressurised supply source, not shown, via inlet pipe 41 and internal supply manifold 42, which communicates with the individual orifices by means of smaller communicating passages 43. For each jet stream there is provided a linear array of electrodes in the form of a segmented electrode set, for attracting the stream on to a convex collector surface 31. Streams collected on the convex surface 31 pass down the shute 33 to an internal drain manifold 44, internally communicating with a drain outlet pipe 46 and communicating externally with the main printer reservoirs, not shown. Recording fluid 45 which is collected in the manifold section 44 is removed therefrom by a low pressure collector system connected externally to the drain outlet 46.

This apparatus is depicted as it might be used in a typical operation as a computer line printer or in applications for printing textile webs and the like. The recording medium 17 has a character 'X' partially imprinted thereon by the action of projected portions of the recording fluid (several of which, referenced 27, are shown in the transit zone between the printhead and the recording medium 17).

The individual stream deflection electrode sets operate as described above, driven by high voltage propagating waveform signals. Such signals may be connected to the arrays of electrodes by feed through connector pins, or by a metallized or conductive grid or interconnection layer deposited before the formation or attachment of the stream deflection electrodes. Such connection means are well known in the art of printed circuit and integrated circuit manufacture. An electronic interface unit, not shown, is required to drive the printhead to produce character information on the recording medium. Such an interface may readily be constructed by a person of ordinary skill in the art by reference to the relevant waveform information. The travelling wave electrode sets along the lengths of individual streams are driven by programmed signal waveforms to deflect the stream on to the collector surface 31 whenever a slug of liquid is not required on the surface 17. Fluid segments 50 are undeflected by the electrostatic force of attraction and form that part of the character "X" that is to be printed. The timing requirements of the signal waveforms for each stream, and relative to the other streams, may be readily determined by anyone of ordinary skill in this art.

It will be appreciated that although specific embodiments of the invention have been illustrated and described, variations thereto may be made without departing from the present inventive concept.

We claim:

1. A method for producing a supply of liquid slugs of a predetermined length, said method comprising the steps of (a) establishing a continuous stream of liquid from an orifice, said liquid stream having no perturbation applied thereto at or near said orifice, and having a natural break-off point at which the continuous stream breaks up into droplets;

(b) causing the continuous stream of liquid to pass over an array of electrodes positioned between said orifice and said break-off point, said array of electrodes extending in the same direction as said stream of liquid;

(c) applying a voltage signal sequentially to the electrodes of the array at a rate which is substantially equal to the velocity of the liquid of the stream past the electrodes, to deflect a portion of the liquid stream away from the undeflected path of the stream; and (d) interrupting and collecting either the deflected portion or the undeflected portion of the liquid stream.

2. A method as defined in claim 1, in which said array of electrodes is an arcuate array.

3. A method for producing a supply of liquid slugs of a predetermined length, said method comprising the steps of a) establishing a continuous stream of liquid from an orifice;

b) causing the continuous stream of liquid to pass between first and second arrays of electrodes extending in the same direction as said stream of liquid, the electrodes of said first array being in directly opposed relationship to the electrodes of said second array;

c) applying a first voltage signal sequentially to the electrodes of said first array at a rate which is substantially equal to the velocity of the stream of liquid past the electrodes, to deflect a portion (18) of the liquid stream away from the undeflected path of the stream towards the electrodes of said first array;

d) applying a second voltage signal to the two electrodes of said second array which are directly opposed to the two electrodes of said first array that are adjacent to the electrode of said array to which, at any instant, said first voltage signal is applied; the rate of application of said second voltage signal being synchronised with the rate of application of said first voltage signal; whereby the portions of the liquid stream adjacent to said deflected portion are deflected away from the undeflected path of said stream towards said second array;

e) interrupting and collecting either the portion of the liquid stream which is deflected towards said first array or the portion of said liquid stream which is not deflected towards said first array.

4. A method as defined in claim 3, in which said second voltage signal has a magnitude which is substantially less than the magnitude of said first voltage signal.

5. A method as defined in claim 1, in which the interruption and collection of a portion of said liquid stream is effected by a weir with a curved surface to which the collected portion of the liquid stream adheres by the application of the Coanda effect.

6. A method of performing a to-and-fro scan of a continuous stream of liquid comprising the steps of a) causing the continuous stream of liquid to flow from an orifice between a first array and a second array of electrodes, the electrodes of said first array being in directly opposed relationship to the electrodes of said second array; said arrays of electrodes being divergent in the direction of flow of said liquid stream;

b) applying a voltage signal progressively to the electrodes of said first array from the first electrode of said first array to the last electrode of said first array, then removing said applied voltage signal progressively from the electrodes of said first array from the last of the electrodes of said first array to the first electrode of said first array;

c) applying the voltage signal progressively to the electrodes of said second array, from the first electrode of said second array to the last electrode of said second array, then removing the voltage signal progressively from the electrodes of the second array from the last electrode of the second array to the first electrode of the second array; and d) repeating steps (b) and (c).

7. Apparatus for producing a supply of liquid slugs of a predetermined length, said apparatus comprising:

a) an orifice for establishing a continuous stream of a liquid;

b) an array of electrodes mounted adjacent to the path of the continuous stream of liquid;

c) means for applying a voltage signal sequentially to the electrodes of said array at a rate which is substantially equal to the velocity of the stream of liquid past the electrodes, whereby a charge of opposite polarity to the voltage signal is induced on a portion of the liquid stream which is moving past the electrodes and said portion of liquid is deflected towards the array of electrodes; and d) interruption means positioned to intercept either the undeflected stream of liquid or the portion thereof which is deflected towards the array of electrodes;

whereby the liquid which is not intercepted by said interruption means forms a liquid slug or at least one droplet.

8. Apparatus as defined in claim 6, wherein said array of electrodes is an arcuate array.

9. Apparatus as defined in claim 7, wherein said array of electrodes is a first array of electrodes and said apparatus includes i) a second array of electrodes, the electrodes of said second array corresponding in number and dimension to the electrodes of the first array, said first and second arrays of electrodes being located on opposed sides of the path of the liquid stream; and ii) means for applying a second voltage signal to the two of the electrodes of said second array which are directly opposed to the electrodes of said first array that are adjacent to the electrode of said first array to which said first-mentioned voltage signal is applied, whereby the portions of said liquid stream which are adjacent to said two electrodes of said second array are deflected towards said second array.

10. Apparatus as defined in claim 9, wherein said second voltage signal is smaller in magnitude than said first-mentioned voltage signal.

11. Apparatus as defined in claim 7, in which said or each means to apply a voltage signal comprises an electrode driver connected to each electrode, each said electrode driver being responsive to a signal from a shift register connected to a clock oscillator, 12. Apparatus as defined in claim 7, including:

a) two arcuate arrays of electrodes mounted in opposed relationship relative to the path of the liquid stream, generally orthogonal to said first array or to said first and second arrays; and b) means to apply a raster scan voltage signal progressively to the electrodes of said two arcuate arrays.

13. Apparatus as defined in claim 7, in which the interruption means comprises a weir with a curved surface, to which the collected liquid adheres by the operation of the Coanda effect.

14. Apparatus as defined in claim 13, including a baffle mounted downstream of said weir, the top of said baffle being formed as a blade member, the space between the weir and the baffle defining a collection channel for liquid collected by the interruption means.

15. Apparatus as defined in claim 7, in which each electrode of said array of electrodes comprises a plurality of electrode segments, arranged to form a cylindrical electrode, the axis of which is the path of said liquid stream, and said means to apply a voltage signal comprises means to apply a voltage signal to at least one segment of the electrodes of said array.

16. Apparatus for performing a to-and-fro scan of a continuous stream of liquid comprising a) means for generating a continuous stream of liquid from an orifice;

b) a first array and a second array of electrodes, said first and second arrays being mounted in opposed relationship to said liquid stream, with the arrays being divergent in the direction of flow of said liquid stream;

c) means to apply a voltage signal progressively to the electrodes of said first array from the first electrode thereof to the last electrode thereof, and to progressively remove the voltage signal from the electrodes of the first array from the last electrode thereof to the first electrode thereof; and d) means to apply a voltage signal progressively to the electrodes of the second array from the first electrode thereof to the last electrode thereof, and to progressively remove the voltage signal from the electrodes of the second array from the last electrode thereof to the first electrode thereof.

17. A method as defined in claim 3, in which the interruption and collection of a portion of said liquid stream is effected by a weir with a curved surface to which the collected portion of the liquid stream adheres by the application of the Coanda effect.

18. A method as defined in claim 9, in which said means to apply a voltage signal comprises an electrode driver connected to each electrode, each said electrode driver being responsive to a signal from a shift register connected to a clock oscillator.

19. Apparatus as defined in claim 9, including:

(a) two arcuate arrays of electrodes mounted in opposed relationship relative to the path of the liquid stream, generally orthogonal to said first array or to said first and second arrays; and (b) means to apply a raster scan voltage signal progressively to the electrodes of said two arcuate arrays.

20. Apparatus as defined in claim 19, in which the interruption means comprises a weir with a curved surface, to which the collected liquid adheres by the operation of the Coanda effect.

* * * * *